March 28, 1967 J. B. RIIS 3,311,340
EQUIPOISE MECHANISM PARTICULARLY FOR SUPPORTING LAMPS
AND SMALL TELEVISION SETS
Filed July 23, 1965
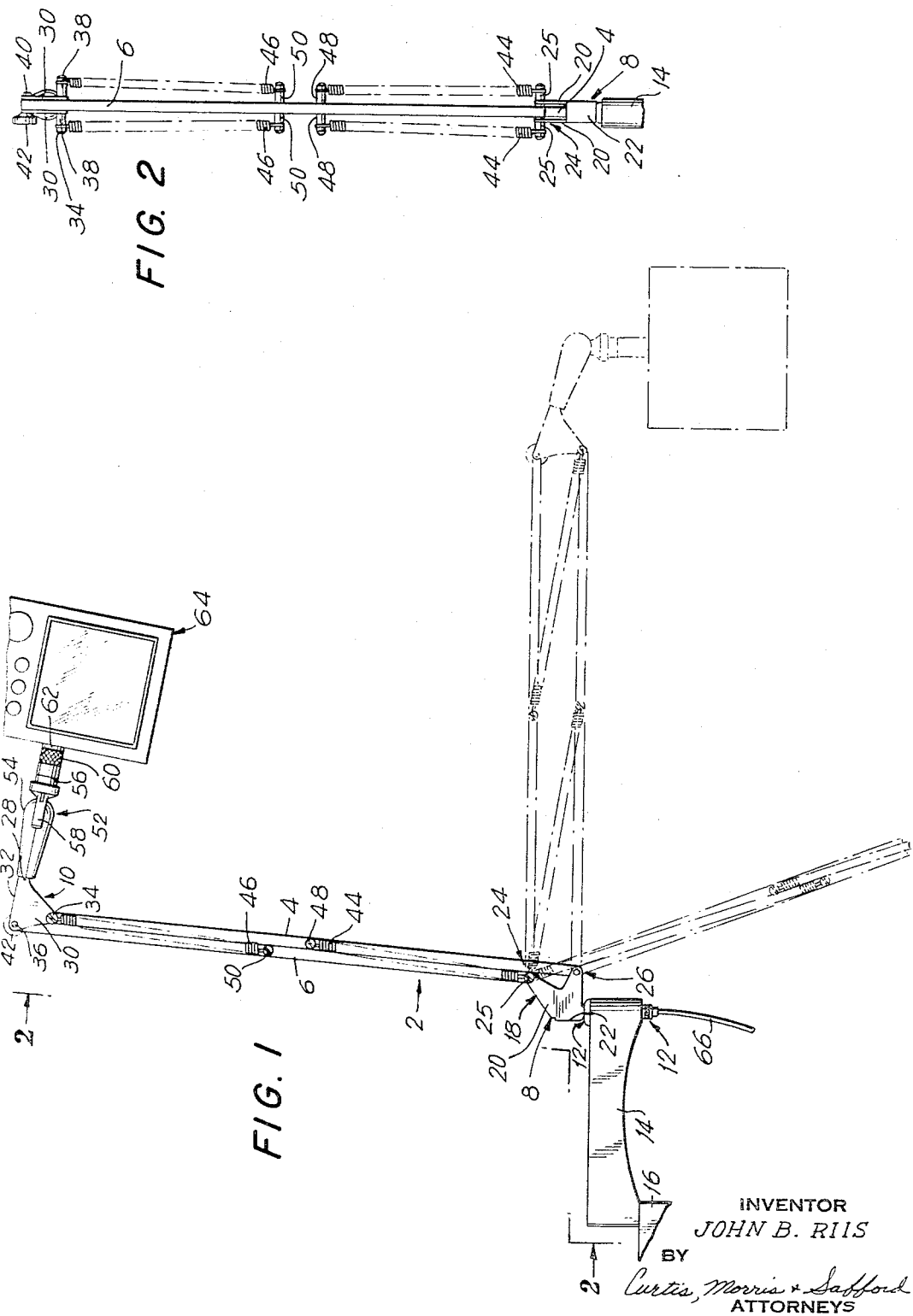
INVENTOR
JOHN B. RIIS
BY
Curtis, Morris & Safford
ATTORNEYS

United States Patent Office 3,311,340
Patented Mar. 28, 1967

3,311,340
EQUIPOISE MECHANISM PARTICULARLY FOR SUPPORTING LAMPS AND SMALL TELEVISION SETS
John B. Riis, Riverside, Conn., assignor to Luxo Lamp Corporation, Port Chester, N.Y., a corporation of New York
Filed July 23, 1965, Ser. No. 474,334
3 Claims. (Cl. 248—284)

This invention relates to spring counterbalance mechanisms, and more in particular to equipoising mechanisms which may be used in the form of the swing arm and linkage mechanisms for various unitary objects, for example, lamps and small television sets, and having counterbalance springs which provide an equilibrium or balanced condition throughout a range of movement of the arm.

An object of this invention is to provide improved counterbalance and equipoising mechanisms. A further object is to provide such mechanisms which will support relatively heavy objects throughout a wide range of movement with minimum variation in the balancing forces. A further object is to provide mechanisms of the above character which are adapted to support objects with great precision, but which permit the objects to be moved with relatively no resistance forces. A further object is to provide mechanisms of the above character which are sturdy in construction, dependable in use, and which will perform satisfactorily even after long periods of use. Another object is to provide for the above in such a manner as to avoid the difficulties which have been encountered with similar mechanisms in the past. These and other objects will be in part obvious and in part pointed out below.

Equipoising and counterbalancing mechanisms have been provided which are similar to that of the present invention and which have proven very satisfactory for supporting the shade and lamp assemblies of desk lamps and the like. With such prior mechanisms the weight of such an assembly is not great, so that the pivot connections of the linkage are not subjected to excessive wear. Also, very satisfactory friction means may be provided to resist movement of the arms or links forming the assembly. Therefore, if the springs do not provide complete counterbalancing throughout the range of movement, the friction means may be adjusted to insure that the assembly will stay in the position to which it is moved. However, with heavy lamp heads and particularly with other heavier objects or units, it has been difficult to provide a thoroughly satisfactory counterbalancing mechanism of this type.

Simply increasing the sizes of the linkages and the springs of mechanisms of the prior type will not provide satisfactory support for heavier objects. With such increases in sizes and heavier objects, there are proportionately increased problems resulting from the normal manufacturing tolerances and variations in the dimensional characteristics of the various components, and in the changes due to wear on the components during use. It has not proven to be fully satisfactory to provide friction means to compensate for the much greater variations in the counterbalancing forces. The increased pull of the springs tends to cause excessive wear in certain of the pivots in the assembly, so as to cause an ever increasing problem of overcoming the deficiency between the counterbalancing forces and the weight of the supported object.

It is an object of the present invention to overcome the difficulties which have been encountered in the past with this type of mechanism and to provide thoroughly satisfactory structures and mechanisms.

In the drawings:
FIGURE 1 is a perspective view of one embodiment of the invention illustrating the range of movement; and,
FIGURE 2 is a view on the line 2—2 of FIGURE 3.

Referring to FIGURE 1 of the drawings, an equipoise mechanism 2 is formed by a pair of tubes or arms 4 and 6, a supporting bracket 8 and a supported bracket 10. Supporting bracket 8 is pivoted by an elongated pivot portion 12 in the free end of a rigid swinging arm 14 which in turn is pivoted in a similar swinging bracket 16. Bracket 16 is swingably mounted upon a wall bracket not shown. The upper portion of supporting bracket 8 is formed by an arm supporting bracket 18 which is formed by two spaced parallel plates 20 (see also FIGURE 2) which are interconnected by an integral portion 22 which in turn is integral with the elongated pivot portion 12. Arms 4 and 6 are pivoted at their lower ends upon arm supporting bracket 18 respectively by pivots 24 and 26 (FIGURE 1). Pivot 26 is formed by a sleeve which extends through plates 20 and a reinforced pivot through the end of the arm, and a bolt which extends with a snug fit through the sleeve. Pivot 24 is formed by a sleeve which extends through the reinforced end of the arm and the plates 20, and a bolt extends through the sleeve with a snug fit and is threaded at both of its ends. A pair of spring posts 25 act as nuts upon the respective ends of the bolt and also provide spring anchors as will be discussed below. Supported bracket 10 is somewhat similar to bracket 8 with an elongated pivot 28 integral with a pair of parallel side plates 30 and an interconnecting portion 32. The upper ends of arms 4 and 6 are pivoted between plates 30 by a pair of spaced pivots 34 and 36, respectively. Pivot 34 is identical with pivot 24 with a sleeve extending through arm 4 and plates 30 and a bolt which is threaded on both ends and has spring anchor posts 38 which are threaded on the respective end of the bolts and are tightened against the ends of the sleeve. Pivot 36 is similar to pivot 26 and is formed by a sleeve extending through the reinforced end of the arm and plates 30, and a bolt 40 and a thumb nut 42 which may be turned to adjust the friction between plates 30 and the side surfaces of arm 6. This provides an adjustable friction pivot or joint to be discussed below.

Mounted upon the opposite sides of arms 4 and 6 (see FIGURE 2), are two pairs of coil tension springs 44 and 46, respectively. Springs 44 are mounted at their lower ends respectively upon the posts 25 and at their upper ends upon a pair of similar posts 48, which (see also FIGURE 1) are mounted upon the opposite sides of arm 4 near the center thereof, there being a bolt (not shown) which extends through the arm and has threaded ends which receive the posts. Springs 46 are mounted at their upper ends upon posts 38 and at their lower ends upon a pair of posts 50 which are mounted upon the opposite sides of arm 6 near the center of the arm and in a manner identical with the mounting of posts 48. Hence, the two pairs of springs bias arms 4 and 6 toward the vertical position shown in full lines in FIGURE 1. However, the arms may be swung down about their respective pivots through the range represented by the position shown in broken lines. During such swinging movement springs 44 and 46 are extended and provide counterbalancing forces as will be discussed below.

Mounted upon pivot 28 of the supported bracket 10 is a universal joint assembly 52, which includes a pivot bracket 54 which snugly receives pivot 28 and is adapted to turn about the axis of that pivot. Pivot bracket 54 provides a transverse pivot for a swinging bracket 56 which has an annular pivot portion 58 positioned between the bifurcated end of bracket 54 interconnected by an internal pivot structure. Bracket 56 also has a connector sleeve 60 which is threaded onto a mating bracket 62 upon the casing of a light-weight television set 64 which is the object supported by the equipoise mechanism of the illustrative embodiment. The television set 64 may be swung about the pivots formed by brackets 54 and 56 and it may be moved throughout a wide range vertically as illustrated in broken lines. The set may also be moved about the horizontal axes formed by pivot 12 in bracket 14 and the vertical pivots provided by bracket 16.

The electrical connections to the television set are provided through a coaxial cable 66 which extends upwardly through the center of pivot 12 and thence internally through the equipoise mechanism and the pivot structures. Arms 4 and 6 are tubular and are reinforced at their ends as discussed above.

With this structure the springs 44 and 46 provide extremely uniform counterbalancing forces throughout the entire range of movement of the set 64. Hence, the set may be moved by exerting a very small force and it remains in any selected position. Thumb nut 42 may be tightened to increase the frictionous effect at pivot 36 which results from the clamping of plates 30 against the sides of the end of arm 6. Such friction effects resist the vertical movement of the set. The forces of spring 44 act to draw arm 4 counterclockwise about its pivot 26 and springs 46 act to draw arms 6 counterclockwise about their pivot 36. These counterbalancing forces of the two sets of springs are cooperative in providing the counterbalancing forces. However, the particular linkage and spring arrangement distributes and balances these forces so that the entire arm and linkage assembly is subjected to uniformly distributed action. The over-all result is to provide a mechanism which is light in weight, sturdy, and which is not subject to excessive wear or other objectionable characteristics.

I claim:
1. In an equipoise mechanism of the character described, the combination of, a pair of parallel arms of substantially the same length and comprising a first arm and a second arm, an arm-supporting bracket assembly comprising an elongated pivot and an arm-supporting bracket, first pivot means pivoting said arms on said arm-supporting bracket respectively upon a pair of parallel axes which are spaced from each other at a predetermined distance axially with respect to said elongated pivot, a supported bracket which is positioned at the ends of said arms opposite said arm-supporting bracket and which is adapted to provide support for an object, said supported bracket comprising a pair of interconnected metal plate portions positioned in spaced parallel relationship upon the opposite sides of adjacent ends of said arms, second pivot means forming a pair of pivots connecting said plate portions to the respective ends of said arms with axes spaced from each other said predetermined distance axially of said elongated pivot, whereby a linkage assembly is provided by which said supported bracket is maintained in a predetermined relationship with respect to said elongated pivot axis when it is moved during the swinging action of said arms, a first pair of coil springs positioned in parallel relationship upon the opposite sides of said arms with one end of each of the springs being attached to said supporting bracket at the pivot for said first arm and with the other end of each of said springs being attached to said second arm, a second pair of coil springs positioned respectively upon the opposite sides of said arms and substantially parallel to each other, one end of each of said second pair of springs being attached to said supported bracket at the pivot of said second arm and having its other end attached to said first arm, said springs cooperating to provide balanced and equalized forces at the pivots to counterbalance the weight of a supported object.

2. A mechanism as described in claim 1 wherein said elongated pivot is pivoted with a substantially vertical axis, and which mechanism includes a universal joint assembly mounted upon said supported bracket and attached to support an object.

3. A mechanism as described in claim 1 wherein said springs are substantially parallel, and wherein said first pair of springs is attached to said second arm substantially at the center thereof, and said second pair of springs is attached to said first arm at substantially the center thereof.

References Cited by the Examiner

UNITED STATES PATENTS 2,787,434  4/1957  Jacobsen _____ 248—280
3,000,606  9/1961  Storm _____ 248—284

FOREIGN PATENTS 43,111  5/1938  Netherlands.
336,567  4/1959  Switzerland.

CLAUDE A. LE ROY, *Primary Examiner.*

W. D. LOULAN, *Assistant Examiner.*